Oct. 23, 1951 R. W. JONES 2,572,266

ALL-RELAY TELEPHONE SYSTEM HAVING TWELVE LINES GROUPED IN THREE GROUPS OF FOUR EACH

Filed July 22, 1947 6 Sheets-Sheet 1

INVENTOR.
ROY W. JONES

BY McWalter Owen

ATTORNEY

INVENTOR.
ROY W. JONES
BY
[signature]
ATTORNEY

INVENTOR.
ROY W. JONES
BY
Mc Walter Owen
ATTORNEY

Oct. 23, 1951 R. W. JONES 2,572,266

ALL-RELAY TELEPHONE SYSTEM HAVING TWELVE LINES GROUPED IN THREE GROUPS OF FOUR EACH

Filed July 22, 1947 6 Sheets-Sheet 4

INVENTOR.
ROY W. JONES

BY Wm. Watts Owen

ATTORNEY

Oct. 23, 1951 R. W. JONES 2,572,266

ALL-RELAY TELEPHONE SYSTEM HAVING TWELVE LINES
GROUPED IN THREE GROUPS OF FOUR EACH

Filed July 22, 1947 6 Sheets-Sheet 5

INVENTOR.
ROY W. JONES

BY *Mc Walter Owen*

ATTORNEY

Oct. 23, 1951 R. W. JONES 2,572,266

ALL-RELAY TELEPHONE SYSTEM HAVING TWELVE LINES GROUPED IN THREE GROUPS OF FOUR EACH

Filed July 22, 1947 6 Sheets-Sheet 6

INVENTOR.
ROY W. JONES

BY Wm. Walter Owen.

ATTORNEY

Patented Oct. 23, 1951

2,572,266

UNITED STATES PATENT OFFICE 2,572,266

ALL-RELAY TELEPHONE SYSTEM HAVING TWELVE LINES GROUPED IN THREE GROUPS OF FOUR EACH

Roy W. Jones, Rochester, N. Y., assignor to Automatic Electric Laboratories, Inc., Chicago, Ill., a corporation of Delaware Application July 22, 1947, Serial No. 762,752

10 Claims. (Cl. 179—18)

The present invention relates, in general, to telephone systems and particularly to automatic telephone systems of the all relay type.

The main object of the invention is the production of new and improved circuit arrangements for a small automatic exchange of the all relay type having a capacity of ten subscriber lines and two trunk lines and which can be manufactured very cheaply while retaining all the features necessary for modern and dependable telephone service.

A feature of the invention is the trunking arrangement in the finder-allotter which groups the ten lines and two trunk lines into three groups of four each, each group having first access to a different finder connector link.

A further feature of the invention is an arrangement whereby the dialing of the first digit of a called number chooses one of two groups of code rings, chooses the side of the line over which ringing current will be sent, and operates a particular connector tens relay.

A still further feature of the invention relates to a subgroup relay in the connector which operates in combination with one of two units relays to connect only with lines having units designation digits greater than two.

Other objects and features of the invention will become apparent upon a further perusal of the specification taken in conjunction with the accompanying drawings which form a part of the specification.

Figure 1:
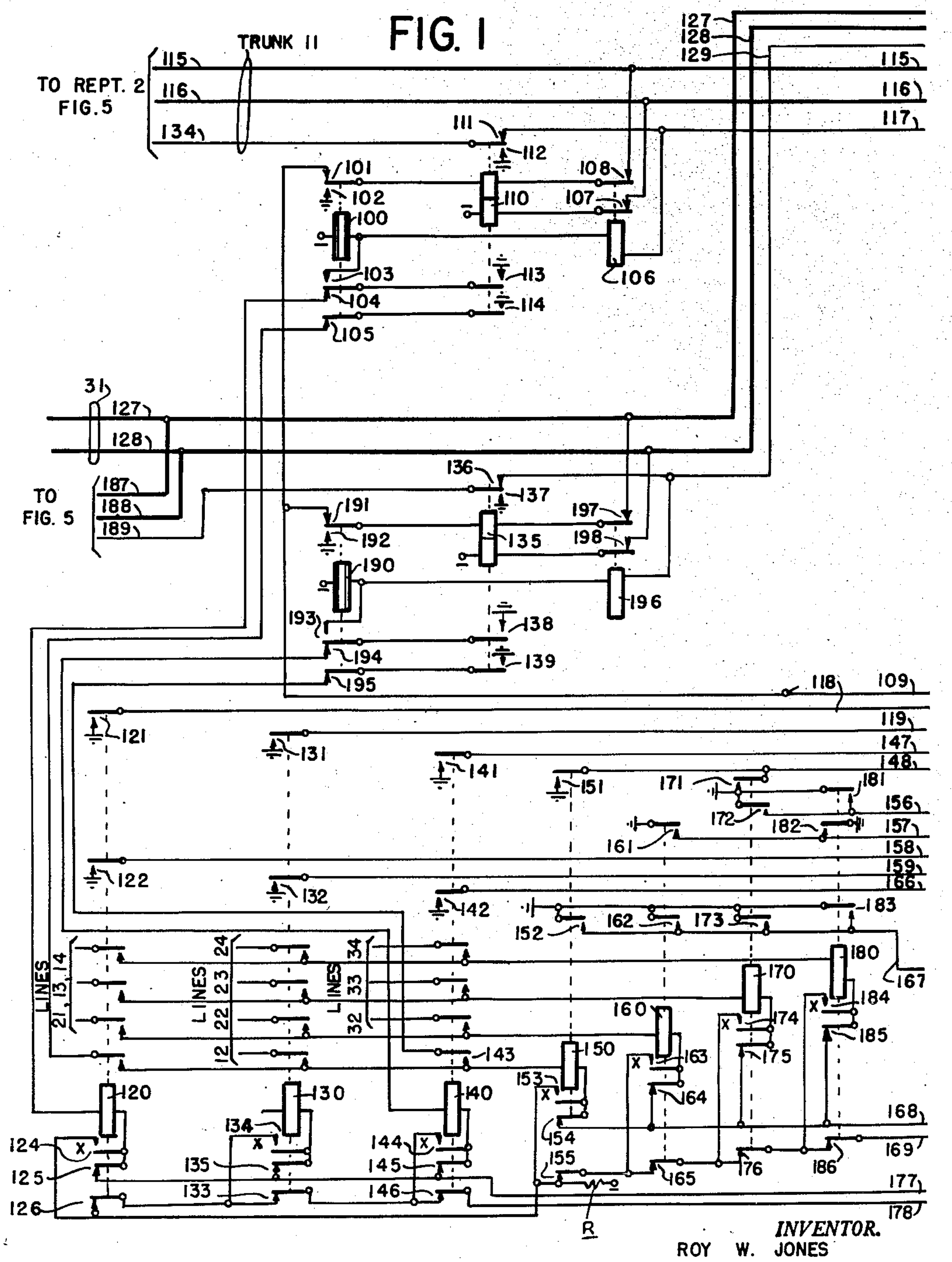
Figure 2:
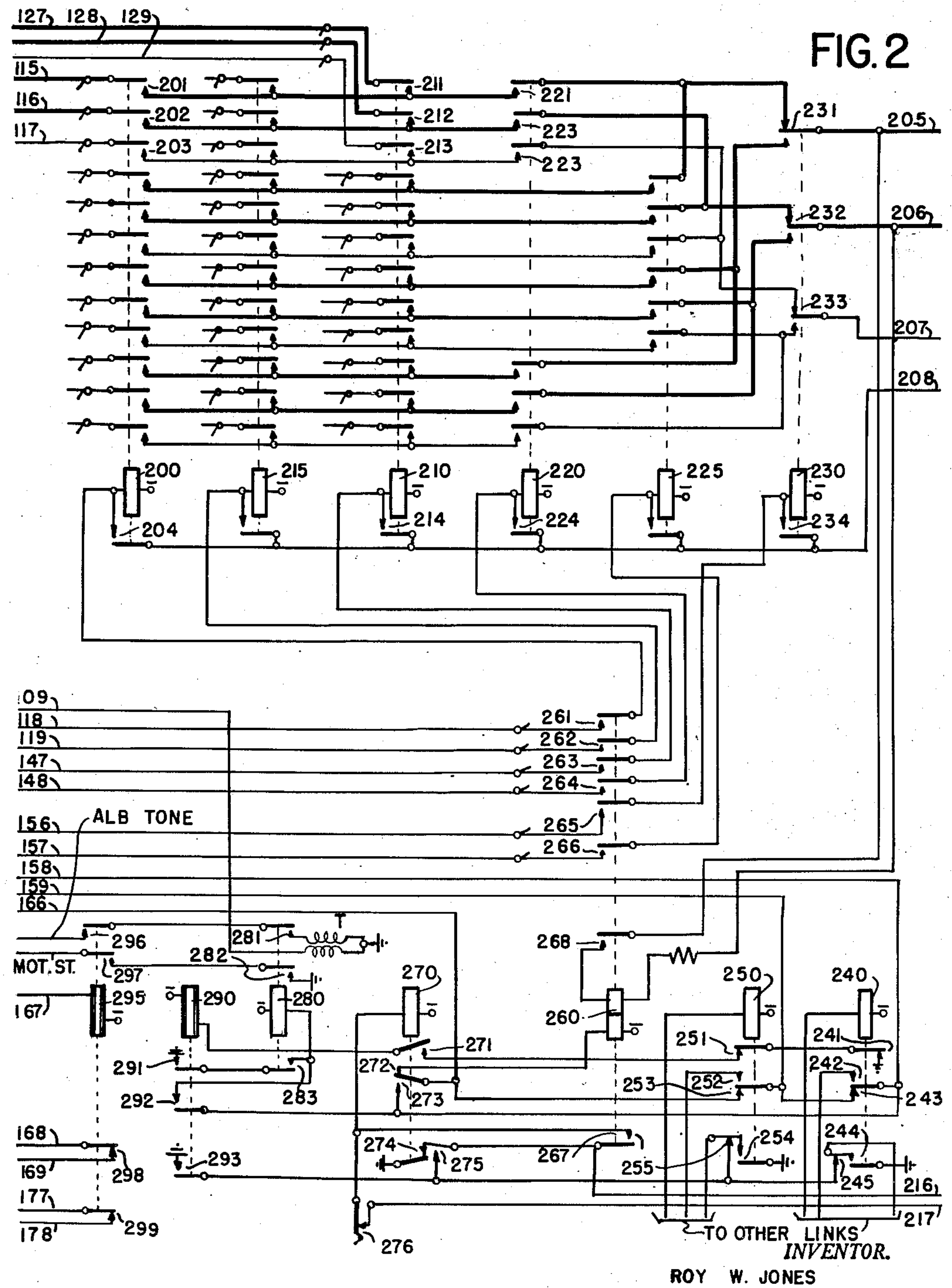
Figures 3, 7:
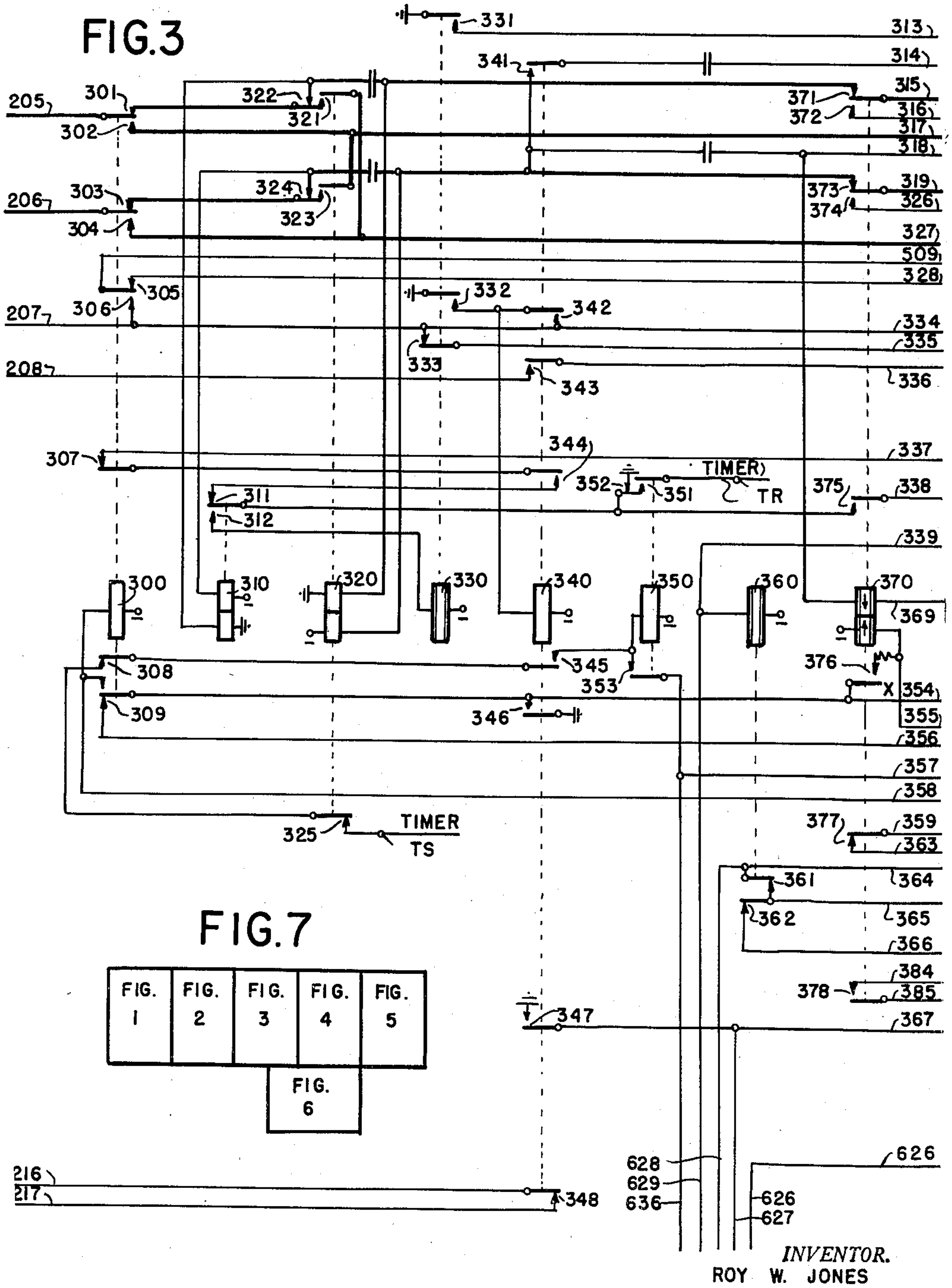
Figure 4:
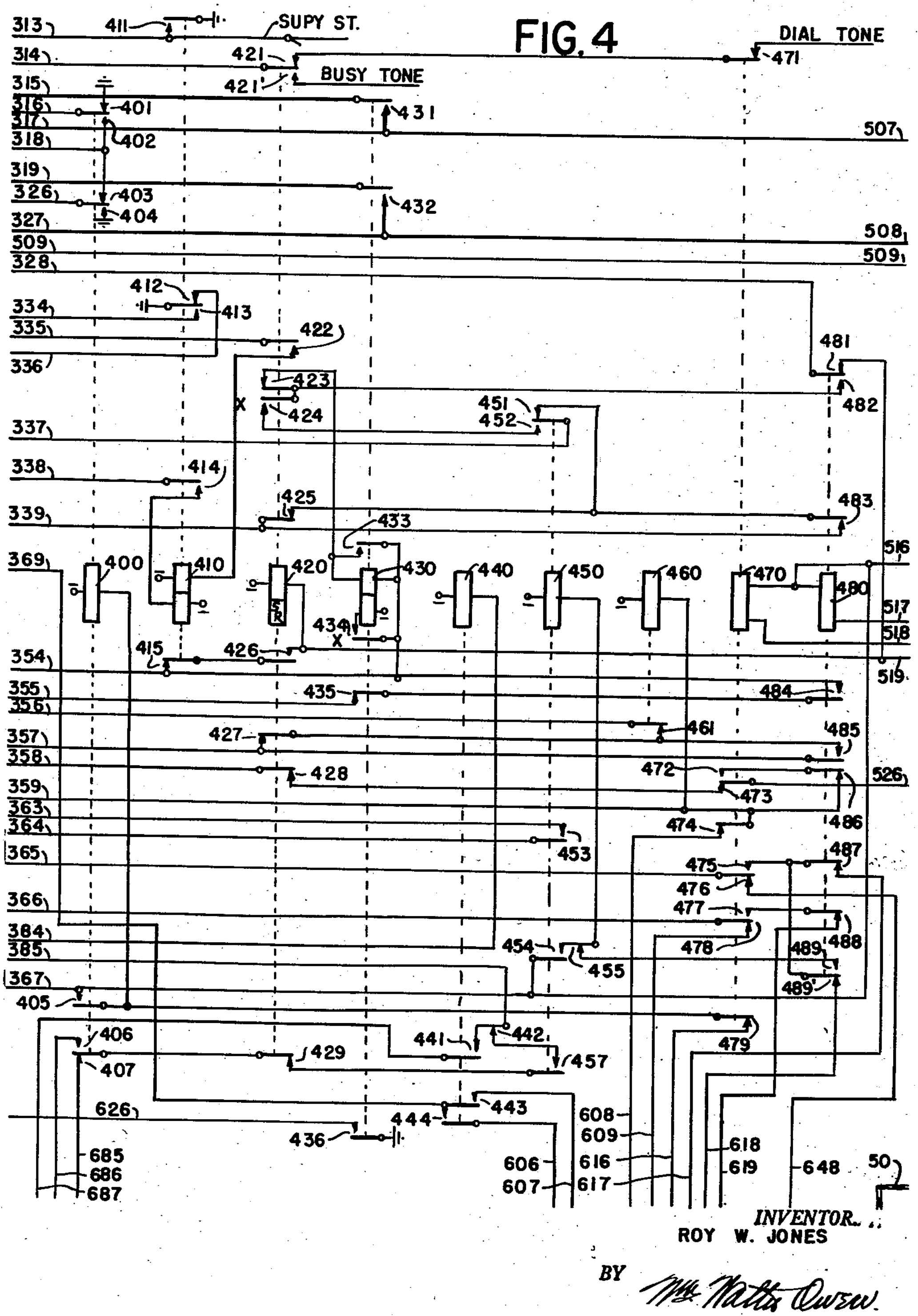
Figure 5:
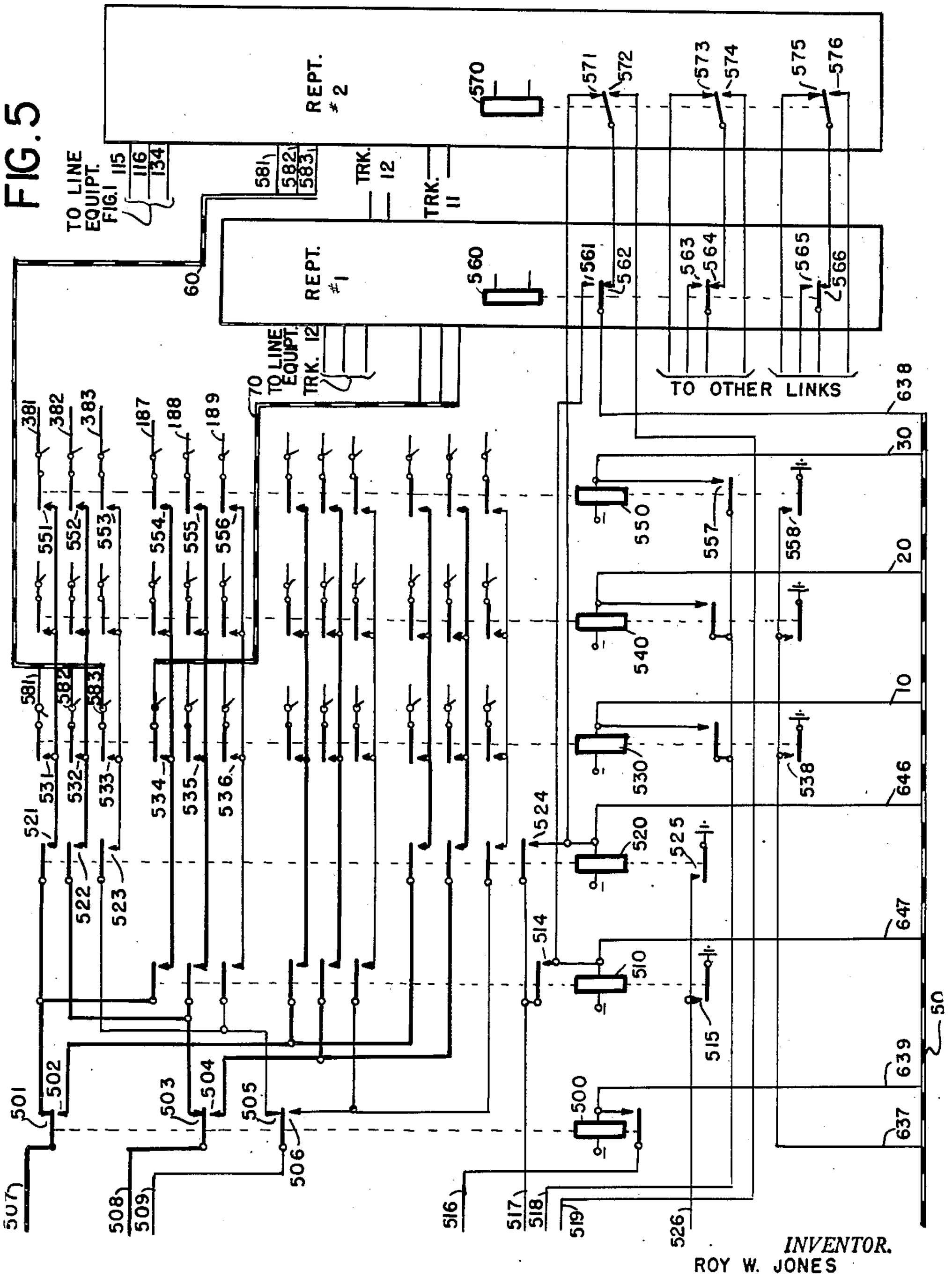
Figure 6:
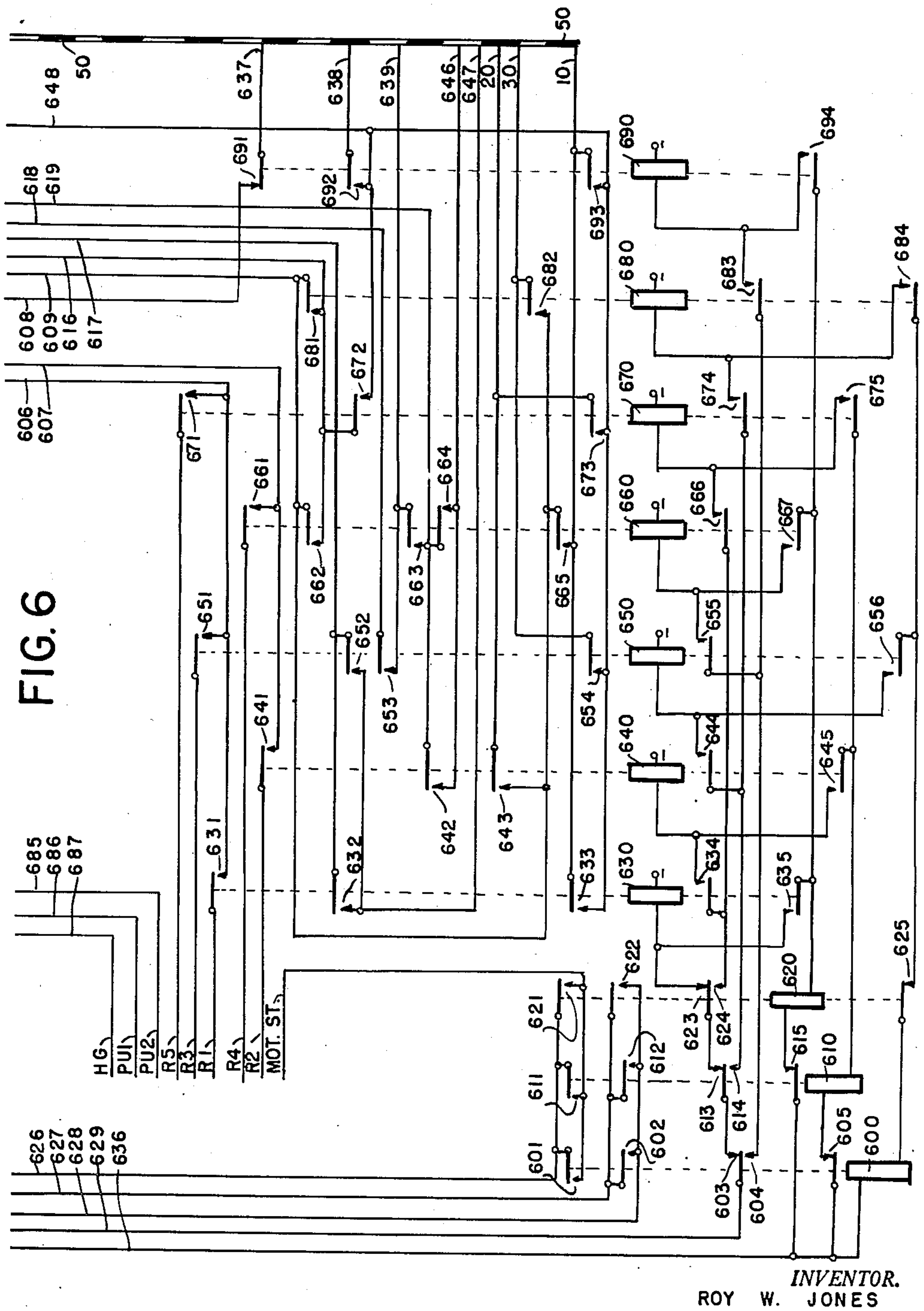

The drawings when arranged as indicated in Figure 7, with adjoining lines abutting, represents a portion of an all relay type automatic telephone system. This system has a capacity of ten lines and two trunks, both of the trunks having the same distant destination. Figure 1 shows a subscriber's line circuit and a trunk circuit together with an allotter marking circuit. Figure 2 shows a finder switch and a link allotter for allotting idle finder-connector links. Figures 3, 4, 5, and 6 show an all relay type connector. Figure 5 also shows a partial illustration of two trunk repeaters. These repeaters may be of any suitable type, it being only necessary that they include a relay such as 560 or 570 which is energized when the repeater is idle and deenergized when the repeater is busy, and that they return ground over the control conductor when seized. It is to be understood that in the interest of simplicity, various units of system are not shown complete but rather show only what is thought necessary to disclose the invention and principal embodiments thereof. The call allotter in Figure 2 shows only one connect relay 270, it being understood that such a connect relay is necessary for each allotter relay such as 240 and 250. It is apparent that while only one finder connector link is shown, the complete system includes three such links.

The system is arranged for either bridged or divided ringing, each line having a maximum of ten subscribers thereon. Two separate ring code groups are provided, each group comprising five distinct ring codes. One group of ring codes will be applied from one side of the line to ground and the other group from the other side of the line to ground. Subscribers' lines are numbered 13, 14, 21, 22, 23, 24, 31, 32, 33, and 34. The directory number of a subscriber on line 14 with ring code 5 from the first group of ring codes would be 145. The directory number of a subscriber on line 14 with the ring code 5 from the second ring code group would be 445. The directory number of a subscriber on line 22 having a ring code 3 from the second group of ring codes would be 523. The directory numbers of subscribers in the thirty group of lines having the second group of ring codes would begin with the digit 6. It follows, then, that each line has two directory numbers, i. e. 13, 43, or 24, 54, or 31, 61 etc., the called subscriber's directory number depending on which code group he is associated with. For the purposes of simplicity in the specification, the lines will be referred to using the tens series numbers 1, 2, and 3.

The invention will be best understood by following the operation of the circuit in the extension of a call. Let us assume that a subscriber on line 31 desires to call a subscriber on line 32 with the ring code 2, in which case the calling subscriber will dial the digits 322. The calling subscriber initiates the call by closing a loop circuit across conductors 127 and 128 in a well known manner. Relay 135 now operates from battery, lower winding of relay 135, contacts 198, conductor 128, subscriber's loop circuit, conductor 127, contacts 197, upper winding of relay 135, contacts 191, conductor 109, and winding of tone transformer T to ground. Relay 135 grounds two marking leads to the call allotter at contacts 138 and 139, and grounds to connector normal control lead 189, at contacts 137 thus busying the line to any incoming calls. The ground at contacts 138 is extended through contacts 194, winding of relay 140, contacts 145, conductor 177, contacts 299, conductor 178, contacts 146, 133, 126, and resistance R to battery. Relay 140 operates and at preliminary make contacts 144, locks up to battery at resistance R through contacts 126 and 133. Relay 140 opens its original energizing circuit at contacts 145 and 146 and opens the energizing circuits of relays 120 and 130 at contacts 146 thus preventing the call allotter from being seized by another call. Relay 140 also completes an energizing circuit for relay 260 at contacts 142 and extends ground from contacts 139 through contacts 195, 143, winding of relay 150, contacts 154, conductor 168, contacts 298, conductor 169, contacts 186, 176, 165, 155, and resistance R to battery. Relay 150 now operates and at preliminary make contacts 153 locks up to battery through resistance R, opens its original energizing circuit at contacts 154 and 155, opens the operating circuits of relays 160, 170, and 180 at contacts 155, and completes an obvious circuit to relay 295 at contacts 152. Relay 295 thus energized closes a point in the all links busy tone circuit at contacts 296, closes a point in the motor start circuit at contacts 297, and opens further points in the energizing circuits of relays 150, 160, 170, and 180 at contacts 298 and of relays 120, 130, and 140 at contacts 299.

Relay 270 is shown in an operated position thus indicating that the finder-connector link of which it is a part, is in an idle condition hence relay 260 will respond to the operation of relay 140 by energizing over the following circuit; from battery, winding of relay 260, contacts 272, conductor 166, to ground at contacts 142. In operating, relay 260 completes a temporary locking circuit for relay 270 at contacts 267, switches the allotter marking leads through to the finder tens and units relays 200, 215, 210, 220, 225, and 230 at contacts 261, 262, 263, 264, 265, and 266, and bridges its upper, non-inductive winding across the speaking leads 205 and 206 at contacts 268. Relay 210 now operates from ground at contacts 141 through conductor 147, contacts 263, and winding of relay 210 to battery, and relay 220 operates from ground at contacts 151 through conductor 148, contacts 264, and winding of relay 220 to battery. Relays 210 and 220 operated in combination, results in the switching through of the calling subscribers talking conductors 127, 128 and associated control conductor 129, through contacts 211, 212, 213, contacts 221, 222, 223, and contacts 231, 232, 233 to the connector leads 205, 206, and 207.

If all the finder-connector links happen to be busy at the time the call in question is initiated, in which case relays 240, 250, and 270 would all be in a deenergized condition, ground would be extended from contacts 241, through contacts 251, 271, and the winding of relay 290 to battery. Relay 290 thus operated would prepare a locking circuit for relay 280 at contacts 291, prepare an energizing circuit for relay 280 at contacts 292, and prepares a re-start circuit for relays 240, 250, and 270 at contacts 293. The ground from contacts 142 would now be extended through contacts 273, 292, and the winding of relay 280 to battery. Relay 280 would operate and complete the motor start circuit at contacts 282, lock up to ground at contacts 291 through contacts 283, and connect busy tone to one side of the tone transformer T. This tone would be induced into the secondary winding of the transformer thence through conductor 109, contacts 191, upper winding of relay 135, contacts 197 to conductor 127 and the calling subscriber's telephone to indicate a busy condition in the exchange. Suppose now that the call in question is completed then released while the other two links, represented by relays 240 and 250, are still busy and therefore in a normal position. Relay 270 will restore in response to the opening of contacts 348, when the connector is seized. In this case, all links are in a busy condition and relay 290 will operate as previously explained. When the connection in question is released, contacts 348 will be closed and the ground from contacts 293 will be extended through contacts 275, conductor 216, contacts 348, conductor 217, busy key 276, and winding of relay 270 to battery. Relay 270 will operate indicating an idle condition of the link with which it is associated.

It should be noted that the ten lines and two trunks are divided into three groups of four lines each. The allotter is arranged so that each group of lines has first access to one of the three finder connector links. If a call originates from either lines 11, 13, 14, or 21, relay 120 would be energized and extend ground from contacts 122, through conductor 158 to relay 240, if it is idle, through contacts 242, and the guard circuit. Thus we see that these lines have first access to the finder connector link represented by relay 240. If this link is busy, the marking ground is extended to the next link through contacts 243 in a well known manner. Similarly lines 12, 22, 23, and 24 have first access to the link represented by relay 250, and lines 31, 32, 33, and 34 to the link represented by relay 270. It is apparent that should there be a failure in any one of the connectors, only calls originating from one group of lines would be blocked and then only until the faulty link is busied out. It will be noted that the two trunk lines are split so that each trunk line has first access to a different link thereby precluding the possibility of blocking all trunk calls by the failure of one link.

It will be noted that any line having a units designation digit greater than 2 will operate either marking units relay 170 or 180. The operation of either of these relays will cause ground to be extended through either contacts 172 or 181, conductor 156, contacts 265 and winding of subgroup relay 230 to battery thus preparing the extension of a call from one of these lines to the connector.

Returning now to the original condition, the shunting of conductors 205 and 206 by the upper winding of relay 260 causes relay 310 to operate over the circuit from battery, upper winding of relay 310, contacts 324, 303, conductor 206, upper winding of relay 260, contacts 268, conductor 205, contacts 301, 322, and lower winding of relay 310 to ground. Relay 310 operates and at contacts 312 extends ground from contacts 352 through the winding of relay 330 to battery. Relay 330 thus energized completes a circuit to the supervisory equipment at contacts 331, opens a point in the circuit to relay 410 at contacts 333 and completes an obvious circuit to relay 340 at contacts 332. Relay 340 operates and grounds conductor 207 at contacts 342, extends ground from contacts 412 through contacts 343 to conductor 208, closes a point in the pulsing circuit at contacts 344, closes a point in a timing circuit at contacts 345, applies a main holding ground at contacts 346, grounds conductors 367 and 627 at contacts 347, and opens a point in the energizing circuit of relay 270 at contacts 348. Ground on conductor 208 holds relays 210 and 220 locked energized through contacts 214 and 224. Ground on conductor 207 is extended through contacts 233, 223, 213, conductor 129 and windings of relays 196 and 190 to battery. Relay 196 now operates in series with slow to release relay 190 and at contacts 197 and 198, disconnects the line relay 135 from the line thus causing it to restore. Relay 135 in restoring removes ground from the two marking leads to the allotter at contacts 138 and 139 and also opens a locking circuit to relay 190 at contacts 138, relay 190 now being held by ground on conductor 129. Relay 140 restores and opens the operating circuits of relays 150, at contacts 143, and relay 260, at contacts 142. Relay 260 restores and opens the temporary locking circuit of relay 270 at contacts 267, removes the resistance bridge from line relay 310 at contacts 268, and at contacts 261—266 disconnects the marking leads from the finder. Relay 270 restores thus indicating the busy condition of the finder connector link with which it is associated.

The calling subscriber now receives a dial tone signal through contacts 471, 421, conductor 314, contacts 341, 324, and 303 to the calling subscriber's line. In response to receiving dial tone, the calling subscriber dials the first digit of the desired number, which in this case is the digit 3, thereby causing the connector line relay 310 to release and reoperate 3 times. Upon the first release of relay 310, the operating circuit to "hold" relay 330 is opened at contacts 312. Relay 330 is a slow to release relay having a copper sleeve over its core and therefore will not restore during impulsing. Relay 310 also completes a multiple circuit to relay 360 and to the register pulsing circuit at contacts 311. These circuits may be traced as follows; ground at contacts 352 through contacts 311, 344, 307, conductor 337, contacts 451, 425, conductor 339 and divided (1) through the winding of relay 360 to battery, and (2) through conductor 629, contacts 603, 613, 623, and the winding of relay 630 to battery. Relay 360 operates and because of its slow to release characteristics, will remain operated during digital pulsing, thereby, at contacts 361 and 362, preventing the counting relays in the register from being effective until the end of each digit. Relay 630 operates and prepares a circuit for relay 640 at contacts 634, and extends its operating ground to relay 620 through contacts 635. Relay 620 is shunted by ground on conductor 636 as follows; ground at contacts 346 through contacts 309, conductor 356, contacts 461, 427, conductor 357 to conductor 636. When relay 310 next re-energizes, the operating ground of relay 630 is removed at contacts 312 and relays 630 and 620 now operate in series from ground on conductor 636 through contacts 615, winding of relay 620, contacts 635 and winding of relay 630 to battery. Relay 620 thus operated, at contacts 624 transfers the pulsing circuit to relay 640 which will operate at the next deenergization of relay 310. Relay 310 next deenergizes causing relay 640 to operate from the pulsing conductor 629 through contacts 603, 613, 624, 634, and the winding of relay 640 to battery. Relay 640 prepares a circuit for relay 650 at contacts 644 and extends its operating ground to relay 610 through contacts 645. Relay 610 is shunted by ground on conductor 636, as was relay 620, but operates in series with relay 640 when the operating ground for relay 640 is removed at contacts 311 responsive to the next re-energization of relay 310. Relay 610, at contacts 614, transfers the pulsing circuit to relay 650 and opens the series energizing circuit for relays 620 and 630 at contacts 615 thus causing these relays to restore. Relay 650 operates in response to the third deenergization of relay 310 from ground on the pulsing conductor 629 through contacts 603, 614, 644, and winding of relay 650 to battery. Relay 650 extends its operating ground through contacts 656 and 625 to relay 600. Relay 600 is shunted by ground on conductor 636 in the same manner as was relay 610. The calling subscriber has now completed dialing the first digit 3 hence relay 310 reenergizes and remains energized during the interdigital pause. The reenergization of relay 310 causes the operating ground for relay 650 to be removed at contacts 311 consequently relays 600 and 650 now operate in series from ground on conductor 636 through the winding of relay 600, contacts 625, 656 and the winding of relay 650 to battery. Relay 600 opens the series energizing circuit of relays 610 and 640 at contacts 605 thus causing these relays to restore leaving relays 600 and 650 as the only register relays remaining energized at the end of the first digit. Relay 360, having lost its operating ground at contacts 311, restores after a short interval.

Ground is now extended from contacts 347 through conductor 627, contacts 602, conductor 628, contacts 361, conductor 365, contacts 476, conductor 648, contacts 654, conductor 30 through cable 50, and winding of relay 550 to battery. Relay 550 operates and extends its operating ground to relay 470 through contacts 557 and conductor 518. Relay 470 is shunted by ground on the other side of its winding as follows; from ground at contacts 347 through conductor 367 to relay 470. Relay 550 also extends ground from contacts 558 through conductor 637 and cable 50, contacts 691, conductor 608, contacts 474, and the winding of register release relay 460 to battery. Relay 460 operates and opens the series energizing circuit for relays 600 and 650 at contacts 461. Relays 600 and 650 restore, opening the original energizing circuit of relay 550 at contacts 602 and at contacts 654. Relay 470 now operates in series with relay 550 from ground on conductor 367, winding of relay 470, conductor 518, contacts 557, and winding of relay 550 to battery. Relay 470 disconnects dial tone at contacts 471, prepares a new circuit for the register release relay at contacts 472, opens the original energizing circuit of relay 460 at contacts 474, transfers operating ground to the second digit springs of the register relays at contacts 475 and 477, and opens the circuit to the ring reversing relay 400 at contacts 479. Relay 460 restores and prepares the circuit to the register counting control relays 600, 610, and 620 at contacts 461.

The calling subscriber now dials the second digit 2 of the desired number 322 thus causing relay 310 to restore and reoperate two times thereby sending two pulses to the counting relays of the register in the manner previously described. The operation of the register counting and counting control relays is the same as it was for the first digit, relays 620 and 630 operating in series followed by relays 610 and 640. Relay 610, at contacts 615, opens the operating circuit of relays 620 and 630 causing them to restore thus leaving relays 610 and 640 as the only relays operated in the register at the end of the second digit. Relay 360, as before, operates on the first deenergization of relay 310 and remains operated during the digital pulsing but after a slight delay it restores during the interdigital pause. Relay 610 extends the ground from contacts 347 and conductor 627 through contacts 612, conductor 628, contacts 361, 362, conductor 366, contacts 477, 488, conductor 619, contacts 642, conductor 646 through cable 50, and winding of relay 520 to battery. Relay 520 thus energized, extends its operating ground to relay 480 through contacts 524 and conductor 517. Relay 480 is shunted by ground on the other side of its winding from contacts 347 through conductor 367. Relay 520 at contacts 523 closes a circuit to busy relay 420 which is only effective at this time in case the called line is busy as will be described hereinafter. Relay 520 also extends ground from contacts 525 through conductor 526, contacts 472, 486, winding of register release relay 460 to battery. Relay 460 thus energized, opens the series energizing circuit for relays 610 and 640 at contacts 461. Relays 610 and 640 restore thereby opening the original energizing circuit of relay 520 at contacts 612 and 642. Relay 520 remains locked energized now in series with relay 480 from ground on conductor 367, winding of relay 480, conductor 517, contacts 524, and winding of relay 520 to battery. Relay 480 thus operated prepares a circuit for cut through relay 430 at contacts 482, completes an alternative pulsing circuit at contacts 483, completes a circuit to the lower winding of ring cut off relay 370 at contacts 484, prepares an alternative holding circuit for the register relays at contacts 485, opens circuits to the second digit springs of the register counting relays at contacts 486, 487, and 488, and prepares a circuit for the third digit transfer relay 450 at contacts 489. Relay 370 operates from ground at contacts 346 through conductor 354, contacts 484, 435, conductor 355 and lower winding of relay 370 to battery. Relay 370, at preliminary make contacts 376, locks to ground from contacts 346, and prepares the ringing circuit to the line at contacts 372 and 374. Assuming that line 32 is in an idle condition, battery will be returned over the control conductor 383 in a well known manner, through contacts 553, 523, 505, conductor 509, contacts 305, conductor 328, contacts 482, 423, upper winding of relay 430 to ground on conductor 354. Relay 430 thus energized locks up over its lower winding to ground on conductor 354, through preliminary make contacts 434, prepares further points in the ringing circuit at contacts 431 and 432, shunts its upper winding at contacts 433, opens the original energizing circuit of relay 370 at contacts 435, and closes a point in the motor start circuit at contacts 436.

It should be appreciated that at the end of the second digit, relays 520 and 550, operated in combination, have now extended conductors 507, 508, and 509 through contacts 501, 503, and 505, contacts 521, 522, and 523, and contacts 551, 552, and 553 to line 32 as represented by conductors 381, 382, and 383. The calling subscriber now dials the third and last digit 2 which is the ring code selecting digit. As before, relay 310 restores and reoperates two times thereby sending two ground pulses to the counting relays of the register in the manner previously described. The operation of the register counting, and counting control relays is the same as it was for the second digit, relays 620 and 630 operating in series followed by relays 610 and 640. Relay 610, at contacts 615, opens the operating circuit of relays 620 and 630 causing them to restore thus leaving relays 610 and 640 as the only relays operated in the register at the end of the third digit. Relay 360, as before, operates on the first deenergization of relay 310 and remains operated during the digital pulsing but restores, after a slight delay, at the conclusion of pulsing. Relay 610 completes the motor start circuit by extending ground from contacts 436 and conductor 626 through contacts 611 to the motor start lead, and extends ground from contacts 347 and conductor 627, through contacts 612, conductor 628, contacts 361, conductor 365, contacts 475, 489, 455, and winding of relay 450 to battery. Relay 450 opens a point in the pulsing circuit at contacts 451, prepares a circuit for the register release relay 460 at contacts 453, completes an energizing circuit to relay 440 at contacts 457, and at make before break contacts 454, locks up to ground on conductor 367. As has previously been stated, relay 610 completes a motor start circuit to the ring interrupter at contacts 611. This interrupter, the particular type of which is immaterial to the invention, connects pulses of ringing current corresponding to the different ringing codes to the five ringing conductors R1 through R5. The ring interrupter generates five codes each preceded by a distinctive signal such as, for instance, a long ring and a pause then followed by the code ring. This arrangement gives us ten distinctive rings, five code rings alone and five code rings preceded by the distinctive signal. Each line has a capacity of ten stations and if they are arranged for bridged ringing, this arrangement is used. If, however, they are arranged for divided ringing, only the five code rings are needed, five stations being rung from one side of the line to ground and the other five stations being rung from the other side of the line to ground. At the start of each complete ringing cycle, that is, including the prefixed signal, a pulse of ground is applied to the $PU_1$ lead and a ground which lasts the duration of the cycle is applied to the HG lead by the ring interrupter. At the start of each code ring cycle, that is excluding the prefix signal, a pulse of ground is applied to the $PU_2$ lead by the ring interrupter. Assuming now that line 32 is arranged for divided ringing, the first ground pulse from the interrupter that will be effective, will be the ground pulse applied to the $PU_2$ lead at the start of the code ring cycle. This ground is extended through conductor 685, contacts 407, 429, 457, 442, conductor 385, contacts 378, conductor 384, and winding of relay 440 to battery. Relay 440 operates and at make before break contacts 441, lock up to ground on the HG lead from the ring interrupter, and completes the ringing circuit at contacts 443. Ringing code two is now extended from the ring interrupter through ring lead $R_2$, contacts 641, conductor 607, contacts 443, conductor 369, upper winding of relay 370, conductor 318, contacts 403, conductor 326, contacts 374, conductor 319, contacts 432, conductor 508, contacts 503, 522, 552, conductor 382 of line 32, and through the ringing equipment of a maximum of five telephones to ground. Relay 370 is a differential relay having its lower winding energized as was previously explained. The ringing circuit just traced includes the individual telephone ringer which is of such a resistance as to prevent the direct current flowing in this circuit from being strong enough to cause relay 370 to restore.

The ring cycle is repeated until the party for whom the call is intended responds to his particular ring code and answers the call at which time he completes a loop circuit across conductors 381 and 382 in a well known manner. The called party's ringer is now shunted by the loop circuit hence the direct current flowing through the afore traced ringing circuit is of sufficient strength to cause the upper winding of relay 370 to balance out its lower winding thus causing relay 370 to restore. Relay 370 in restoring opens the ringing circuit at contacts 374, opens the locking circuit to its lower winding at contacts 376, completes a circuit to register release relay 460 at contacts 377, and opens the energizing circuit of relay 440 at contacts 378. Relay 440 restores and opens a further point in the ringing circuit at contacts 443. Relay 460 operates from ground at contacts 347 through conductor 627, contacts 612, conductor 628, 364, contacts 453, conductor 363, contacts 377, conductor 359, and winding of relay 460 to battery. Relay 460 operates and as before, opens the holding circuit for the operated register relays, in this case relays 610 and 640, at contacts 461. Relays 610 and 640 restore opening the ringing circuit at contacts 641 and opening the energizing circuit of relay 460 at contacts 612 causing it to restore. The back bridge relay 320 operates, in response to the called party answering, as follows; from ground, upper winding of relay 320, contacts 371, conductor 315, contacts 431, conductor 507, contacts 501, 521, 551, conductor 381, called subscriber's loop circuit, conductor 382, contacts 552, 522, 503, conductor 508, contacts 432, conductor 319, contacts 373, and lower winding of relay 320 to battery. Relay 320 thus energized at contacts 321 and 323, reverses battery to the calling line for supervisory purposes such as metering etc.

The connection has now been completed and the conversation takes place, talking battery for the calling party being had from the line relay 310 and for the called party from the back bridge relay 320. If at the completion of the conversation, the calling party hangs up first, the loop circuit which is holding relay 310 energized, is opened in a well known manner. Relay 310 restores and opens the circuit, to slow to release relay 330 at contacts 312. After a slight delay, relay 330 restores and in so doing opens the supervisory start lead at contacts 331, and removes the holding ground for relay 340 at contacts 332. Relay 340 restores thus opening the supervisory circuit at contacts 341, removes ground from the incoming control conductor 207 at contacts 342, opens the holding circuit for finder connect relays 210 and 220 at contacts 343, and removes two holding grounds at contacts 346 and 347. The removal of ground from the control conductor 207, causes relay 190 and 196 to restore in an obvious manner. The removal of ground at contacts 346 opens the locking circuits of relay 350, 370, and 430, and removes ground from the outgoing control conductor 509. The removal of ground from conductor 509 causes the deenergization of the cutoff and line lockout relays in the called subscriber's line circuit which is similar to the calling subscriber's line circuit as shown in Figure 1. The cutoff relay (like relay 196) in restoring, completes the circuit to the line relay (like relay 135) which in turn closes a locking circuit to the slow to release lockout relay (like relay 190). The removal of ground at contacts 347 opens the holding circuits of relays 450, 470, 480, 510, and 550. Relays 510 and 550 in restoring, disconnect conductors 507 and 508 from the conductors of line 32 thus opening the loop circuit over which the back bridge relay 320 is operating consequently causing it to restore. All relays in the system are now deenergized except the called subscriber's line relay and lock out relay. These relays restore in a well known manner when the called party hangs up. If, at the conclusion of the conversation, the called party hangs up first, the loop circuit over which the back bridge relay 320 is operating is opened and relay 320 restores. This is the only change that takes place in the connection until the calling party hangs up at which time the connection is released in the same manner as has just been described. It should be noted that the deenergization of relay 340 closes contacts 348 thus preparing the associated finder-connector link relays in the call allotter for reenergization to the idle position as has been previously explained.

Suppose now that line 32 is in a busy condition when the call in question is initiated. The equipment functions the same as heretofore up until the end of the second digit at which time relays 550 and 520 will be energized. Line 32, being in a busy condition, will return ground over the control conductor 383 in a well known manner. This ground is extended through contacts 553, 523, 505, conductor 509, contacts 305, conductor 328, contacts 481, conductor 519, and winding of relay 420 to battery. Relay 420 thus energized connects busy tone to the line at contacts 421 through conductor 314, contacts 341, 324, and 303, prepares a circuit for the reverting call relay 410 at contacts 422, opens the circuit to the cut-through relay 430 at contacts 423, opens a point in the pulsing circuit at contacts 425, locks up to ground from contacts 346, through contacts 415 and 426, opens a point in the circuit to the switch-through relay at contacts 428, and opens the energizing circuit of the pick up relay 440 at contacts 429. The calling party may hang up in response to the receipt of busy tone or may continue and dial the third digit. If the calling subscriber dials the third digit 2, the register relays will function as before resulting in the operation of relays 610 and 640. The pulsing circuit now goes through contacts 483 instead of contacts 425 and the holding ground for the register relays is extended through contacts 461 and 485 instead of contacts 461 and 427. The closing of contacts 641 by the operation of relay 640 is ineffective because of the open condition of contacts 443, relay 440 never having operated due to relay 420 having opened contacts 429. Busy tone is maintained on the line by relay 420 at contacts 421'. The calling subscriber will now hang up and release the equipment in the same manner as has been previously explained.

Let us now take the case when the same calling subscriber desires to call a subscriber on line 32 but in this case the called party has his ringer connected between conductor 381 and ground instead of between conductor 382 and ground as was the case for the connection just explained. Assuming that the called party is associated with the ring code two as before, the number to be called will now be 622. The operation of the finder allotter circuits in the same as before resulting in the operation of relays 310, 330, and 340 in the connector. Ground from contacts 332 through contacts 342 to conductor 207, releases the call allotter in the same manner as before. Relay 340 connects dial tone to the line through contacts 341 in response to which the calling subscriber dials the first digit six thereby causing the line relay 310 to release and reoperate six times. The first restoration of relay 310 completes a multiple circuit to relay 360 and to the register pulsing circuit at contacts 311. These circuits may be traced as follows; ground at contacts 352 through contacts 311, 344, 307, conductor 337, contacts 451, 425, conductor 339 and divided (1) through the winding of relay 360 to battery, and (2) through conductor 629, contacts 603, 613, 623, and the winding of relay 630 to battery. Relay 360 operates and because of its slow to release characteristics, will remain operated during digital pulsing, thereby, at contacts 361 and 362, preventing the counting relays in the register from being effective until the end of each digit. Relay 630 operates and prepares a circuit for relay 640 at contacts 634, and extends its operating ground to relay 620 through contacts 635. Relay 620 is shunted by ground on conductor 636 as follows; ground at contacts 346, through contacts 309, conductor 356, contacts 461, 427, conductor 357, to conductor 636. When relay 310 next reenergizes, the operating ground for relay 630 is removed at contacts 312 and relays 630 and 620 now operate in series from ground on conductor 636 through contacts 615, winding of relay 620, contacts 635, and winding of relay 630 to battery. Relay 620 thus operated, at contacts 624, transfers the pulsing circuit to relay 640 which will operate at the next deenergization of relay 310. Relay 310 next deenergizes, causing relay 640 to operate from the pulsing conductor 629 through contacts 603, 613, 624, 634 and the winding of relay 640 to battery. Relay 640 prepares a circuit for relay 650 at contacts 644 and extends its operating ground to relay 610 through contacts 645. Relay 610 is shunted by ground on conductor 636, as was relay 620, but operates in series with relay 640 when ground is removed from the pulsing conductor 629 at contacts 311 responsive to the next re-energization of relay 310. Relay 610, at contacts 614, transfers the pulsing circuit to relay 650, and opens the series energizing circuit of relays 620 and 630 at contacts 615 thus causing these relays to restore. Relay 650 operates in response to the third deenergization of relay 310 from ground on the pulsing conductor 629, through contacts 603, 614, 644, and winding of relay 650 to battery. Relay 650 extends its operating ground through contacts 656 and 625 to relay 600. Relay 600 is shunted by ground on conductor 636 in the same manner as was relay 610. Relay 600 operates in series with relay 650 when ground is removed from conductor 629 by the reenergization of relay 310. Relay 600 operates opening the series energizing circuit for relays 610 and 640 at contacts 605 and transferring the pulsing circuit to relay 660 at contacts 604. Relay 660 energizes in response to the next deenergization of relay 310 from ground on conductor 629, through contacts 604, 625, and winding of relay 660 to battery. Relay 660 operates and extends its operating ground through contacts 667 to relay 620, which is shunted by ground on conductor 636. Relay 620 operates in series with relay 660 when relay 310 reenergizes and removes ground from conductor 629. Relay 620 operates and opens the series energizing circuit of relays 600 and 660 at contacts 625 and transfers the pulsing circuit to relay 670 at contacts 624. The register counting and counting control relays continue to respond to the pulsing of relay 310, relays 610 and 670 operating on the fifth pulse and relays 600 and 680 on the sixth and last pulse. Relay 600 opens the series energizing circuit of relays 610 and 670 at contacts 605 thus leaving relays 600 and 680 as the only ones operated at the end of the first digit. Relay 600 also extends ground from contacts 347 and conductor 627 through contacts 602, conductor 628, contacts 361, 362, (relay 360 having restored during the interdigital pause), conductor 366, contacts 478, conductor 609, dividing (1) through contacts 681, conductor 616, contacts 479, and winding of ring reverse relay 400 to battery and (2) through contacts 682, conductor 30 of cable 50, and winding of relay 550 to battery. Relay 400 thus energized prepares the ringing circuit at contacts 402, prepares a point in the start circuit of relay 440 at contacts 406, and locks up to ground on conductor 367 at contacts 405.

The dialling of the subsequent digits of the number 622 proceeds in the same manner as was described in the first case resulting in the operation of relays 520 and 550, the transfer relays 450, 470, and 480, cut through relay 430, and the ring cutoff relay 370. At the end of the last digit, register relays 610 and 640 are operated. Relay 610 completes a motor start circuit for the ringing equipment at contacts 611. A pulse of ground will be applied to lead $PU_1$ at the start of the complete ringing cycle (that is, including the prefix signal plus the ring code). The ground pulse on $PU_1$ is extended through conductor 686, contacts 406, 429, 457, 442, conductor 385, contacts 378, conductor 384, and winding of relay 440 to battery. Relay 440 completes the ringing circuit at contacts 443 and at make before break contacts 441, locks up to ground applied to the HG lead by the ring interrupter. Ring code 2 plus a prefixed signal, is now extended from the ring interrupter and lead $R_2$, through contacts 641, conductor 607, contacts 443, conductor 369, upper winding of relay 370, conductor 318, contacts 402, conductor 316, contacts 372, conductor 315, contacts 431, conductor 507, contacts 501, 521, 551, conductor 381 of line 62, and through a maximum of five telephone ringers to ground. Further operations incident to the completion and release of the equipment are the same as for the first case.

It will be noted that, should the called number contain the units designation digit 3 or 4, subgroup relay 500 will be operated from ground extended through either contacts 653 or 663, conductor 639 of cable 50 and winding of relay 500 to battery to prepare the extension of a call to any one of lines 13, 14, 23, 24, 33, or 34.

*Reverting call*

Taking the case now when the calling subscriber on line 31 desires to call another subscriber on the same line with the ringing code 2. In this case the called number will be 312. The finder allotter operation is again the same as before resulting in the operation of relays 310, 330, and 340 in the connector. The calling subscriber dials the first digit 3 causing relay 310 to restore and reoperate 3 times. The register relays follow the pulses sent over the pulsing circuit by relay 310, relays 630 and 620 operating on the first pulse followed in succession by relays 640, 610, and 650, 600 on the second and third pulses respectively. Relay 650 causes the operation of relays 550, 470, and 460 in a familiar manner. The second digit 1 is dialled by the calling subscriber resulting in the operation of register relays 630 and 620. Relay 620 extends ground from contacts 347 and conductor 627 through contacts 622, conductor 628, contacts 361, conductor 365, contacts 475, 487, conductor 617, contacts 632, conductor 647 in cable 50, and winding of relay 510 to battery. Relay 510 thus energized, extends its operating ground to relay 480 through contacts 514 and conductor 517. Relay 480 is shunted, at present, by ground at contacts 347 through conductor 367, the combination of relays 510 and 550 being operated causes conductors 507, 508, 509 to be connected through contacts 501, 503, 505, contacts 511, 512, 513, and contacts 554, 555, 556, to conductors 187, 188, and 189 of line 31. Ground from contacts 332 is extended through contacts 342, conductor 207, contacts 233, 223, 213, conductor 129, contacts 136, conductor 189 (Figure 5), contacts 556, 513, 505, conductor 509, contacts 305, conductor 328, contacts 481, conductor 519, and winding of busy relay 420 to battery. Busy relay 420 operates and connects busy tone to the line at contacts 421', prepares a circuit for relay 410 at contacts 422, opens the energizing circuit for relay 430 at contacts 423, opens the start circuit for relay 440 at contacts 429, and locks up to ground on conductor 354 through contacts 415 and 426. Relay 510 also completes a circuit for register release relay 460 from ground at contacts 515 through conductor 526, contacts 472, 486, and winding of relay 460 to battery. Relay 460 operates and at contacts 461, opens the holding ground circuit for relays 620 and 630 thus causing them to release and in turn open the original energizing circuit of relay 510 at contacts 622 and 632. Relay 480 now operates in series with relay 510 from ground on conductor 367 through the winding of relay 480, conductor 517, contacts 514, and winding of relay 510 to battery.

The calling subscriber now dials the last digit 2. Relay 310 responds causing the operation of register relays 620 and 630 followed by relays 610 and 640. The pulsing circuit under this condition extends through contacts 451 and 483 instead of 451 and 425 as was the case before. Ground on conductor 357 from contacts 346 is extended through contacts 461 and 485 instead of 461 and 427 as before. As was the case in the busy condition, contacts 641 are ineffective for the moment because of the open position of contacts 443. Relay 610 extends ground from contacts 347 and conductor 627 through contacts 612, conductor 628, contacts 361, conductor 365, contacts 475, 489, 455, and winding of relay 450 to battery. Relay 450, thus energized, prepares a maintaining ground circuit for the control conductor 189 at contacts 452, locks up to ground from contacts 347 at make before break contacts 454, closes a point in the energizing circuit of relay 440 at contacts 457, and prepares a circuit to the register release relay 460 at contacts 453. At the end of the third and last digit we have the following connector relays energized; line relay 310, hold and hold slave relays 330 and 340, ring cutoff relay 370, busy relay 420, third digit transfer relay 450, first and second digit transfer relays 470 and 480, tens and units connect relays 510 and 550, and register relays 610 and 640.

In accordance with customary practice in making a reverting call, the calling subscriber hangs up after having dialed the called number and hearing the busy tone. In hanging up, the calling subscriber opens the loop circuit over which line relay 310 is operating hence it restores. In restoring, relay 310 opens the energizing circuit for slow to release relay 330 at contacts 312. After a slight delay relay 330 restores and at contacts 333 completes an energizing circuit for reverting call relay 410 as follows; from ground at contacts 352 through contacts 311, 344, 307, conductor 337, contacts 452, 424, 482, conductor 328, contacts 305, conductor 509, contacts 505, 513, 556, conductor 189, contacts 136 (Figure 1), conductor 129, contacts 213, 223, 233, conductor 207, contacts 333, conductor 335, contacts 422, and upper winding of relay 410 to battery. The above traced ground circuit is also extended through contacts 342 and the winding of relay 340 to maintain relay 340 energized when ground at contacts 332 is removed by the restoration of relay 330. Relay 410 operates and locks up to ground, over its lower winding, from contacts 352 through contacts 375, conductor 338 and contacts 414, opens the locking circuit of slow to release relay 420 at contacts 415, and at contacts 412, opens the locking circuit for the finder connect relays 210 and 220 which now restores. The connection between conductors 127, 128, and 129, and 205, 206, and 207 is severed by the restoration of relays 210 and 220. Relay 410 also connects ground at contacts 413 through conductor 334, contacts 342 and winding of relay 340 to battery thus maintaining relay 340 energized even after relays 210 and 220 restore thereby opening its previous holding circuit. It should be pointed out that the hereinbefore traced ground circuit from contacts 352 through the connector and conductor 189 to the line circuit of line 31 in Figure 1 is maintaining relays 190 and 196 operated in an obvious manner. This circuit includes preliminary make contacts 424 on the slow to release busy relay 420. A short time after the operation of relay 410, relay 420 will restore thereby at contacts 423, substituting the ground from contacts 346 through conductor 354, and the upper winding of relay 430 for the ground from contacts 352 formerly extended through contacts 424 for maintaining relays 190 and 196 energized. Contacts 424 being preliminary make contacts, will be the last to open on deenergization of relay 420. The holding ground circuit for relays 190 and 196 now includes the upper winding of relay 430 hence relay 430 operates in series with relays 190 and 196 and at preliminary make contacts 434, locks up over its lower winding to ground from contacts 346. Relay 430 at contacts 433 shorts its upper winding to connect direct ground to conductor 189 to mark line 31 busy and to maintain relays 196 and 190 operated. Relay 430 also closes a point in the ringing circuit at contacts 432 and completes the motor start circuit from ground at contacts 436 through conductor 626 and contacts 611 to the ringing equipment. Relay 420, in restoring, completes the start circuit for relay 440 at contacts 429. Relay 440 operates on a pulse of ground applied to the $PU_2$ lead by the ring interrupter at the start of the code ring part of the ringing cycle (i. e. not including the prefixed signal). This ground pulse is extended from the $PU_2$ lead through conductor 685, contacts 407, 429, 457, 442, conductor 385, contacts 378, conductor 384 and winding of relay 440 to battery. Relay 440 locks up to ground through make before break contacts 441 to ground applied to the HG lead by the ring interrupter during each complete ringing cycle, and completes the ringing circuit at contacts 443. Ringing current code two is now extended from the ring interrupter and lead $R_2$ through contacts 641, conductor 607, contacts 443, conductor 369, upper winding of relay 370, conductor 318, contacts 493, conductor 326, contacts 374, conductor 319, contacts 432, conductor 508, contacts 503, 512, 555, conductor 188 of line 31, and a maximum of five telephone ringers to ground. The ring cycle is repeated until the called party or the calling party removes his receiver from its hook switch.

If the called party answers ring cut-off relay 370 restores and lock bridge relay 320 operates over the loop circuit resulting there from in the same manner as in the first case. In answering the call, the called subscriber also shunts his ringer in a well known manner thereby completing a direct current circuit through the upper winding of relay 370 as has been previously explained. Relay 370, being a differential relay, restores due to the energization of both of its windings and opens the ringing circuit at contacts 374, opens the holding circuit of relay 410 at contacts 375, completes an energizing circuit to register release relay 460 at contacts 377, opens the start circuit for relay 440 at contacts 378, and lastly, opens the locking circuit for its lower winding at contacts 376. Relay 460 operates from ground at contacts 347 and conductor 627 through contacts 612, conductor 628, conductor 364, contacts 453, conductor 363, contacts 377, conductor 359, and winding of relay 460 to battery thereby opening the holding ground circuit for the register relays 610 and 640 at contacts 461 in a familiar manner. Relays 610 and 640 restore, the latter, at contacts 612, opens the energizing circuit of relay 460 thus causing it to restore. Relay 410 restores and opens the holding ground circuit for relay 340 at contacts 413 thereby causing relay 340 to restore. Relay 340 removes the two main holding grounds for the connector at contacts 346 and 347. Relays 450, 470, 480 and connect relays 510 and 550 restore in response to this action. Relay 320 restores when its operating circuit is opened by the restoration of relays 510 and 550. The connector is now in a normal condition ready to receive another call, and is completely severed from the line 31. Ground is no longer returned over conductor 189 Figure 1 therefore relay 196 deenergizes. Relay 196 restores and at contacts 197 and 198, completes an obvious circuit for line relay 135 over the answering substation loop circuit. Relay 135 operates and completes an obvious locking circuit for relay 190 at contacts 138 before slow to release relay 190 restores. Relay 190 maintains the marking circuits to the allotter in an open condition and relay 135 busies the line to incoming calls at contacts 137. Talking battery is furnished through the windings of line relay 135.

The calling subscriber waits a reasonable time before removing his receiver from the hookswitch at which time he may converse with the called party, if the called party has answered in the interim, or wait for the called party to answer. When the conversation has been completed and both parties hang up, the loop circuit over which line relay 135 is operating is opened in a well known manner. Relay 135 restores and opens the locking circuit for relay 190 at contacts 138 thereby causing relay 190 to restore and return the line circuit to its normal condition.

*Trunk calls*

Taking the case now when the calling subscribed on line 31 desires to be connected with one of the two trunks with which the exchange is equipped. In this case, the calling subscriber will dial the single digit 0 in accordance with established custom. Actually the calling subscriber could dial any of the digits 7, 8, 9, or 0 to get trunk service as we shall presently see. The allotter, finder equipment functions in a now familiar manner to find the calling line 31 and connect its three conductors 127, 128, and 129 through to connector leads 205, 206, and 207 resulting in the energization of relays 310, 330, and 340 in the connector. Relay 340 connects dial tone to the line at contacts 341, and releases the call allotter at contacts 342 and 348 by returning ground through contacts 342 and the control conductor 207 to the line equipment to operate relays 190 and 196 thereby removing ground from the marking leads to the allotter at contacts 194 and 195. The calling subscriber now dials the single digit 0. Relay 310 follows the dial pulses in a well known manner, restoring and reoperating ten times. Every time relay 310 restores it sends a pulse of ground from contacts 352 through contacts 311, 344, 307, conductor 337, contacts 451, 425, conductors 339, and 629 to the register counting and counting control relays. It is thought unnecessary to give a detailed description of the register operation at this point, it being well known in the art and having been previously described in this specification. Suffice it to say that relays 630 and 620 operate on the first pulse followed in succession by relays 640 and 610, 650 and 600, 660 and 620, 670 and 610, 680 and 600, and 690 and 620, each pair of relays releasing the preceding pair. Relays 690 and 620, then, are the only register relays operated at the end of the seventh pulse. The eighth pulse is extended from conductor 629 through contacts 603, 613, and 624 but due to the open condition of contacts 634 and 666, this pulse is ineffective as are the subsequent ninth and tenth pulses. At the end of the tenth and last pulse, relays 690 and 620 are still the only register relays remaining operated. It is understood that slow to release relay 360 operates in an obvious manner on the first ground pulse and, because of its slow to release characteristics, remains operated during the digital pulsing thereby, at contacts 361 and 362, rendering the springs of the register relays ineffective until the end of each digit at which time it restores after a slight delay. Ground is now extended from contacts 347 and conductor 627 through contacts 622, conductor 628, contacts 361, conductor 365, contacts 476, conductor 648, contacts 693, conductor 10 of cable 50, and winding of relay 530 to battery. This ground is also extended from conductor 648 through contacts 692, conductor 638 of cable 50, contacts 562 of repeater number 1 (which is shown as being in a busy condition by the deenergized state of relay 560), contacts 571 of idle repeater number 2, the winding of relay 520 to battery. Relays 520 and 530, operated in combination, causes conductors 507, 508, and 509 to be extended through contacts 501, 503, and 505, contacts 521, 522, and 523, contacts 531, 532, and 533, conductors 581, 582, and 583 of cable 60 to repeater number 2 which is associated with trunk number 11. It should be noted that the ground applied to conductor 637 by relay 530 at contacts 538, for energizing register release relay 460, is ineffective because of the open condition of contacts 691. Relay 520, however, extends ground at contacts 525 through conductor 526, contacts 473, 428 and winding of relay 300 to battery. Relay 300 opens contacts 309 thus performing the same function as relay 460 normally would, by opening the holding ground circuit from contacts 346 to the register relays thus causing them to restore. Relay 300 also locks up to ground from contacts 346 at contacts 309, opens the timing circuit at contacts 308, opens the pulsing circuit at contacts 307, and at contacts 302, 304, and 306, switches conductors 205, 206, and 207 through the connector clear of all bridges and attachments. Relay 310 is now disconnected from the line by the action of relay 300 therefore, relay 310 restores and opens the circuit of slow to release relay 330 at contacts 312, relay 330 restoring after a slight delay. Ground is returned from repeater #2 over conductor 583 of cable 60 through contacts 533, 523, 505, conductor 509, contacts 306, 342, and winding of relay 340 to battery thus maintaining relay 340 energized. Relay 340 maintains the holding ground for the finder tens and units relays from contacts 412 through contacts 343, and maintains the connector holding grounds at contacts 346 and 347. The connection is released by the repeater when it opens the above traced ground circuit thereby allowing relay 340 to restore. Relay 340 opens the above mentioned holding circuit thereby allowing the system to return to normal in a now familiar manner. If both repeaters are busy at the time the call in question is initiated, in which case both relays 560 and 570 will be in a deenergized condition, the ground from the connector applied to the repeaters over conductors 638 will be extended through contacts 562, 572, conductor 519, and winding of busy relay 420 to battery. Relay 420 connects busy tone to the line at contacts 421' through contacts 341 thereby indicating to the calling party that all trunks are busy. The connection is released when the calling party hangs up causing relays 310, 330, and 340 to restore which in turn return the system to normal as has been previously explained.

A call coming from a trunk, say trunk 11, to a local subscriber is extended through repeater number 1 to conductors 115, 116, and 134 and the associated line circuit in Figure 1. The connection will proceed in the same manner as has been described for a local to local call.

The two repeaters shown in Figure 5 are, of course, only skeleton representations. These repeaters may be of any suitable type provided they employ a relay such as 560 or 570 which is in a deenergized state when the repeater is busy and in an energized state when the repeater is idle. The repeater must also return ground over the control conductor when seized and remove said ground when the repeater is released.

Up to this point we have ignored the timer relay 350 and its associated timing circuit in order to present the specification with some degree of continuity. The timing equipment (not shown) puts a short pulse of ground on the TS lead (Figure 3) and at the same time puts a pulse of ground on the TR lead (Figure 3) which is of the duration for which the equipment is to be timed, say three minutes. The ground on TR is momentarily removed just prior to the appearance of the next pulse on TS. When the connector is seized, relays 310, 330, and 340 operate in succession as has been previously explained. Relay 340 at contacts 345, completes an obvious circuit to relay 350 which operates when the short duration pulse is next applied to the TS lead. Relay 350 locks up to ground from contacts 346 as follows; ground from contacts 346 through contacts 309, conductor 356, contacts 461, 427, conductor 357, contacts 353 and winding of relay 350 to battery. Relay 350, at make before break contacts 351, substitutes ground on the TR lead for the ground at contacts 352. If a calling subscriber seizes the connector and then for some reason does not dial but leaves the receiver off the hookswitch, ground on the TR lead will be removed after a specified time, which we have assumed in this case to be three minutes. Relay 330 will now restore after a slight delay and open the energizing circuit for relay 340 at contacts 332. Relay 340 restores and opens the holding circuit for the finder connect relays at contacts 343. The release of the finder causes relay 310 to restore and the system is at normal. The operating circuit for relays 190 and 196 is opened when the finder connect relays restore. Relay 196 restores first and completes an obvious circuit for relay 135 at contacts 197 and 198. Relay 135 operates and completes a locking circuit for relay 190 at contacts 138 before slow to release relay 190 restores. Relay 135 also busies the line to incoming calls at contacts 137. The line circuit is said to be in a lockout condition and will remain thus until the calling subscriber hangs up at which time relay 135 will restore and return the line circuit to normal. The same chain of events will occur if the calling subscriber dials the first or second digits and fails to dial the completed called telephone number, or if he forgets to hang up after completing a call. It will be noted that the switch through relay 300 opens both the start and locking circuits of relay 350 at contacts 308 and 309 respectively. Thus a called trunk connection will not be timed after the single digit trunk number has been dialed. The repeater releases the system after the completion of the conversation thus eliminating the need for the timing circuit once the connection is established.

What is claimed is:

1. In a telephone system, a plurality of lines, said lines divided into a plurality of groups, each of said groups comprising at least four of said lines, each line having a units designation number, an all relay switch for connecting with said lines, said switch having a single odd unit relay for connecting with all of said lines in all of said line groups having an odd units designation number and a single even unit relay for connecting with all of said lines in all of said line groups having an even units designation number.

2. A telephone system as claimed in claim 1 in which said all relay switch also contains a sub group relay which is operated in combination with said units relays in response to the dialling of units designation numbers higher than the number two for connecting with all of said lines in all of said line groups having said higher units designation numbers.

3. In a telephone system, an all relay switch, a ringing interrupter which produces two separate groups of ringing codes, each said group comprised of five ringing codes, each ringing code being distinct from all other said ringing codes, a plurality of lines each line having a distinctive plural digit number associated therewith, said switch including a plurality of tens relays for connecting with said lines, means in said switch operated in response to the dialling of a particular first digit for; selecting one of said code groups for signalling purposes, for selecting the side of a line over which one ringing code of said chosen group of ringing codes will be sent, and for operating a particular one of said tens relays.

4. A telephone system as claimed in claim 3 in which circuit means is provided whereby said particular first digit may be any digit greater than three and less than seven.

5. In a telephone system, a plurality of lines, said plurality of lines including subscribers lines and two similar trunk lines having the same terminating points, said lines arranged in a plurality of groups each group comprising at least four of said lines, two of said groups each including one of said trunk lines, a plurality of all relay finder connector links, each of said groups of lines having first access to a different one of said links.

6. In an all relay telephone system, lines, said lines divided into a plurality of groups each group comprising a plurality of said lines, a marking circuit including a plurality of tens and units relays, each of said tens relays being common to all lines in a particular one of said groups of lines, each of said units relays being common to certain of said lines in all of said groups of lines, a plurality of line finders each including a plurality of tens relays, a call allotter including a plurality of connect relays each being individual to one of said finders, each of said marking circuit tens relays selectively operated only in response to the initiation of a call over any line in its corresponding group of lines for causing one of said connect relays to operate, and for causing a particular one of said finder tens relays to operate.

7. In a telephone system as claimed in claim 6 in which said allotter includes a plurality of auxiliary relays each being associated with a particular one of said connect relays and being energized in case the associated finder is idle, and in which the operation of a particular one of said marking circuit tens relays causes the operation of a particular one of said connect relays only if said particular connect relays associated auxiliary relay is energized.

8. In an all relay telephone system, a plurality of lines, each line having a line relay individual thereto, a transformer having primary and secondary windings, a source of operating current, a circuit including said source and the secondary winding of said transformer for operating any one of said line relays upon the initiation of a call over the corresponding line, a busy tone source, and means for at times connecting said busy tone source to the primary winding of said transformer to thereby induce said tone into said secondary winding to transmit a busy tone over said circuit to said line relays and means for transmitting said last mentioned tone to a line over which a call is initiated.

9. In a telephone system, a plurality of subscriber lines, a plurality of trunk lines having the same terminating points, an automatic switch having access to said subscriber lines and to said trunk lines, relay means in said switch operated in one instance in response to received impulses corresponding to one set of digits to control said switch to seize one of said lines and operated in another instance in response to received impulses corresponding to a different set of digits to seize said same line, and relay means in said switch operated in response to received impulses corresponding to any one of more than two different digits to seize one of said trunk lines.

10. A telephone system such as claimed in claim 9 in which there is circuit means in said switch for determining that said last means is always operated to seize a trunk when the first of the received set of digits is greater than six.

ROY W. JONES.

REFERENCES CITED

The following references are of record in the file of this patent:

UNITED STATES PATENTS

| Number | Name | Date |
|---|---|---|
| 1,386,688 | Clausen | Aug. 9, 1921 |
| 1,639,089 | Jacobson | Aug. 16, 1927 |
| 1,944,570 | Olson | Jan. 23, 1934 |
| 2,100,523 | Saunders | Nov. 30, 1937 |